United States Patent Office 3,018,306
Patented Jan. 23, 1962

1

3,018,306
PRODUCTION OF BUTYRYL HALIDES
Richard F. Sweeney and Cyril Woolf, Morristown, N.J., assignors to Allied Chemical Corporation, New York, N.Y., a corporation of New York
No Drawing. Filed June 9, 1959, Ser. No. 819,004
6 Claims. (Cl. 260—544)

This invention is directed to manufacture of highly fluorinated fluorobutyryl halides and highly fluorinated propanes. More particularly, the invention is directed to processes for the production of compounds represented by the formula $CXF_2(CF_2)_pCR$ in which R is selected from the group consisting of OX and $XF_2$, p is an integer from 1 to 2, and X is selected from the group consisting of chlorine nad fluorine.

Products formed by processes of the invention are all colorless gases or liquids at normal conditions. Representative examples of products which may be made by the processes of the invention include the following fluorobutyryl halides:

Perfluorobutyryl fluoride, $CF_3CF_2CF_2COF$, B.P. 10° C.
Perfluorobutyryl chloride, $CF_3CF_2CF_2COCl$, B.P. 42° C.
1-chloroperfluorobutyryl chloride, $CClF_2CF_2CF_2COCl$, B.P. 75° C.

and the following propanes:

Perfluoropropane, $CF_3CF_2CF_3$, B.P. minus 38° C.
3-chloroperfluoropropane, $CF_3CF_2CClF_2$, B.P. minus 3° C., and
1,3 - dichloroperfluoropropane, $CClF_2CF_2CClF_2$, B.P. 36° C.

A major object of the invention lies in provision of processes for making the above products from certain perfluoroglutaryl dihalide and certain fluorobutyryl halide starting materials by solid catalyst, gas-phase methods, thus avoiding necessity for resorting to synthetic routes involving use of elemental fluorine or equivalent electrochemical fluorination.

In accordance with the invention, it has been found that certain perfluoroglutaryl dihalides and certain fluorobutyryl halides may be catalytically decarbonylated to form the desired products, and we find that certain solid aluminum fluoride ($AlF_3$) materials possess the properties of effectively promoting decarbonylation of the indicated starting material by an easily controllable, all gas-phase, catalytic procedure in accordance with which the desired products may be obtained. The invention includes the discovery of a group of compounds especially adaptable for use as starting materials for decarbonylation, the properties of a particular aluminum fluoride material with regard to catalytically promoting decarbonylation, and certain reaction conditions for carrying out the processes of the invention.

The starting materials of the invention are compounds represented by the formular $CR(CF_2)_nCOX$, in which R is selected from the group consisting of OX and $XF_2$, n is an integer from 2 to 3, and X is selected from the group consisting of chlorine and fluorine. These starting materials include the following perfluoroglutaryl dihalides—

Perfluoroglutaryl difluoride, $COF(CF_2)_3COF$, B.P. 47–48° C.

2

Perfluoroglutaryl chlorofluoride, $COF(CF_2)_3COCl$, B.P. 70° C.
Perfluoroglutaryl dichloride, $COCl(CF_2)_3COCl$, B.P. 108–110° C.

and the following fluorobutyrylhalides—

Perfluorobutyryl fluoride, $CF_3CF_2CF_2COF$
Perfluorobutyryl chloride, $CF_3CF_2CF_2COCl$, and
1-chloroperfluorobutyryl chloride, $CClF_2CF_2CF_2COCl$.

Perfluoroglutaryl dichloride, $COCl(CF_2)_3COCl$, is a known compound, and has been prepared by reaction of either phosphorus pentachloride or thionyl chloride with perfluoroglutaric acid.

The perfluoroglutaryl difluoride, $COF(CF_2)_3COF$, may be prepared from the dichloride by refluxing the same with a mixture of $SbF_3$ and $SbCl_5$ as follows:

Example A.—1085 g. of antimony pentachloride (3.62 mols) were added to 643 g. of $SbF_3$ (3.59 mols) contained in a 2 liter three necked glas flask. The flask was equipped with a stirrer, fractionating column, and a dropping funnel. The antimony halides were heated to 100° C. and kept continuously stirred. 1002 g. (3.63 mols) of perfluoroglutaryl dichloride were added dropwise to the antimony halides during a periof of 16 hours. The temperature in the flask fell to 85° C. because of reflux in the fractionating device, the head temperature at the top of the fractionating column being held at about 47° C. Product was continuously removed from the still head at 47°–48° C. and condensed. At the end of 16 hours, pot temperature rose to 120° C., and refluxing was stopped. The amount of perfluoroglutaryl difluoride (B.P. 47°–48° C.) recovered as condensate was 621 g. (2.54 mols) representing about a 70% conversion of perfluoroglutaryl dichloride to perfluoroglutaryl difluoride.

Example B.—Perfluoroglutaryl chlorofluoride, $$COF(CF_2)_3COCl$$

may be made by a procedure identical with that described for the preparation of the perfluoroglutaryl difluoride except that upon addition of the perfluoroglutaryl dichloride ot the $SbF_3$–$SbCl_5$ catalyst, the rate of take off at the top of the fractionating column is kept at a sufficienly rapid rate so as to maintain a head temperature in the range 65–70° C. In this manner the perfluoroglutaryl chlorofluoride is rapidly removed from contact with the catalyst before complete fluorination is effected. The distillate then may be refractionated to effect final separation between the perfluoroglutaryl dichloride, perfluoroglutaryl chlorofluoride, and perfluoroglutaryl difluoride.

With regard to the $AlF_3$ catalyst employed, it is noted that many different typese of aluminum fluorides are known. In general these materials are composed of $AlF_3$ crystals of relatively large size, i.e. not less than 1000 and usually several thousand Angstrom units radius and above, as in the case of commercial types of $AlF_3$ available on the market. The aluminum fluoride catalysts utilized in accordance with the present invention are of non-crystalline or "amorphous" structure, and when examined by X-ray diffraction technique show extremely small or sub-microscopic crystals designated as "crystallites." These aluminum fluorides are of crystallite size not greater than about 500 Angstrom units radius and are derived by reaction of aluminum chloride and HF. As crystallite size decreases, catalytic activity increases, and the preferred aluminum fluorides are those having crystallite size of about 200 A. and below, as determined by X-ray diffraction technique. Catalytic aluminum fluorides of this type are more fully discussed in U.S.P. 2,676,996 of April 27, 1954 which discloses processes for making the same by procedures involving reaction of aluminum chloride and HF.

Practice of the invention comprises decarbonylating a fluorinated organic starting material of the formula $CR(CF_2)_nCOX$ in which R is selected from the group consisting of OX and $XF_2$, $n$ is an integer from 2 to 3, and X is selected from the group consisting of chlorine and fluorine, and procedurally involves subjecting the starting material in gas-phase to heating at elevated decarbonylating temperature while in the presence of the described anhydrous aluminum fluoride catalyst for a time sufficient to decarbonylate a substantial amount of the starting material, the said catalyst having a crystallite size not substantially greater than 500 Angstrom units radius and having been derived by reaction of aluminum chloride and HF, and finally recovering reaction product containing less CO than the starting material and being of the formula $CXF_2(CF_2)_pCR$ in which $p$ is an integer from 1 to 2, and R and X are as just mentioned.

Reactions involved may be stoichiometrically typified by the following—

(1) $COF(CF_2)_3COF \rightarrow CF_3CF_2CF_2COF + CO$
$\rightarrow CF_3CF_2CF_3 + 2CO$
(2) $COF(CF_2)_3COCl \rightarrow CF_3CF_2CF_2COCl + CO$
$\rightarrow CF_3CF_2CClF_2 + 2CO$
(3) $COCl(CF_2)_3COCl \rightarrow CClF_2CF_2CF_2COCl + CO$
$\rightarrow CClF_2CF_2CClF_2 + 2CO$
(4) $CF_3CF_2CF_2COF \rightarrow CF_3CF_2CF_3 + CO$
(5) $CF_3CF_2CF_2COCl \rightarrow CF_3CF_2CClF_2 + CO$
(6) $CClF_2CF_2CF_2COCl \rightarrow CClF_2CF_2CClF_2 + CO$ It will be observed that products of the invention include fully and partially decarbonylated materials. In this specification and claims, terms such as "decarbonylating" and "decarbonylated," unless otherwise indicated, are intended to include partial or complete decarbonylation. In all embodiments of the invention, the products contain less CO than does the starting material.

Starting materials most usually employed are the perfluoroglutaryl dihalides of reactions 1–3. Mixtures of various starting materials may be utilized. Moreover, if circumstances are such that only fully decarbonylated products are desired, the partially decarbonylated materials, i.e. the fluorobutyryl halides of reactions 1–3, may be used as starting materials, as in reactions 4–6, to form the completely decarbonylated products, i.e. the highly fluorinated propanes. Hence, where the halopropanes are the sought for products from the decarbonylation of the perfluoroglutaryl dihalides, the butyryl halides may recycle back thru the $AlF_3$ reactor, or be separately treated in another $AlF_3$ reactor, reaction conditions in the latter being the same as those in the initial reactor fed with the perfluoroglutaryl dihalides. The invention provides a particularly convenient method for making perfluoropropane, $CF_3CF_2CF_3$, and accordingly preferred starting materials are $COF(CF_2)_3COF$ and $$CF_3(CF_2)_2COF$$

Reaction temperature in all embodiments of the invention is at least above the vaporization temperature of any and all of the starting materials employed. At temperature of about 225° C., in the presence of the crystallite $AlF_3$ catalyst, appreciable decarbonylation is effected with reasonable contact time. Ordinarily, reaction temperature is not below 250° C. Temperatures as high as about 500° C. may be utilized without interfering appreciably with yields, and appreciably higher temperatures are undesirable in order to avoid breakdown to products of carbon-carbon scission. Other factors being equal, higher temperatures promote higher degree of decarbonylation. Preferred temperatures lie substantially in the range of 275–425° C.

Contact time may be varied considerably without noticeable disadvantage to process efficiency. In a general way, increasing contact time and reactor temperature result in higher conversion of starting material to reacted product and higher decarbonylation of starting material, and lowering contact time and reactor temperature result in lower conversion of starting material to reacted product and lower decarbonylation. Contact time may lie in the range of 5–150 seconds or higher, and more preferably in the range of 40 to 115 seconds. To a substantial extent, contact time, reaction temperature and desired degree of carbonylation are interrelated, and product composition may be varied by alteration of contact time or temperature or both. Depending upon the particular starting material used and the product desired, optimum conditions may be determined by test runs.

Reactions proceed favorably at pressures substantially atmospheric or just sufficiently higher to move the vapor-gas stream thru the apparatus train. No advantage accrues from use of super-atmospheric pressure. However, sub-atmospheric pressure may be employed to advantage since lower pressures favor decarbonylation as will dilution of reactants with inert gases such as nitrogen or recycle of part of the formed halopropanes.

Apparatus employed is simple and conventional, and may be understood from the appended examples.

The fluorobutyryl halide products of the invention are valuable intermediates, e.g. for making the propanes disclosed. Moreover, the fluorobutyryl halides may be readily hydrolyzed in accordance with known chemical principles to form chlorofluorobutyric acids. and perfluorobutyric acid a known article of commerce. Thus, the process described affords an economic process for preparing the two vavluable materials, perfluoropropane and perfluorobutyric acid, without recourse to use of elemental fluorine. Further, in a known reaction, alkali metal salts of perfluorobutyric acid may be pyrolyzed to give perfiluoropropene, a valuable monomer. The perfluoropropane is a known dielectric and refrigerant, and the chlorofluoropropanes are known heat transfer media.

In all the following examples, demonstrating practice of the invention, the anhydrous aluminum fluoride catalyst employed had a crystallite size below about 200 Angstrom units radius and had been prepared by procedure substantially the same as in Example C of U.S.P. 2,676,996.

*Example 1.*—About 0.435 liter (438 g.) of the anhydrous aluminum fluoride catalyst indicated, used in pellet form of about 4–8 mesh, were charged into a reactor comprising a 1″ I.D. nickel tube about 36″ long and enveloped for about 30″ of its length by an electrical heating unit. Throughout the run, internal temperature in the reactor was maintained at about 400° C. Over the course of about 3 hours and 10 minutes, 446.5 g. (1.83 mols) of perfluoroglutaryl difluoride, $COF(CF_2)_3COF$ B.P. 47–48° C., were passed in vapor form into the reactor. Contact time was about 52 seconds. With the exception of the CO formed, all the products exiting the reactor were condensed in a trap, cooled by a Dry Ice-acetone mixture. Conversion, i.e. the amount of starting material reacted, was about 19% by weight. On distillation of the condensate collected in the cold trap, 18.7 g. (0.1 mol) of perfluoropropane, $CF_3CF_2CF_3$, boiling at about 38° C., and 54.0 g. (0.25 mol) of perfluorobutyryl fluoride $CF_3CF_2CF_2COF$, boiling at about 10° C. were recovered. The yields of perfluoropropane and of perfluorobutyryl fluoride, based on the perfluoroglutaryl difluoride reacted, were 28% (weight) and 72% respectively.

In the following examples the apparatus employed comprising a pretreating chamber and an aluminum fluoride catalyst reactor connected in series. The pretreating chamber was filled with Columbia 6G carbon pellets, and was employed to purify the reactants prior to admission to the aluminum fluoride catalyst reactor, and thus increase longevity of the aluminum chloride catalyst. It was established that no decarbonylation of reactants occurred by reason of passage of reactants thru the carbon pretreater.

*Example 2.*—The pretreater was a 1" I.D. nickel tube 36 inches long provided with an electrical heater, and the catalyst reactor was a 1" I.D. stainless steel tube 36 inches long heated as in Example 1. The pretreater was filled with 0.438 liter (175 g.) of 8–14 mesh Columbia 6G-activated carbon. The reactor was filled with 0.438 liters (438 g.) of about 4–8 mesh aluminum fluoride pellets. During the run, the pretreater packed with carbon was maintained at an internal temperature of approximately 350° C., and the reactor packed with aluminum fluoride was maintained at a temperature of about 350° C. During a period of 3 hours and 40 minutes 437.0 g. (1.79 mols) of perfluoroglutaryl difluoride were passed thru the pretreater and reactor system. The contact time in the aluminum fluoride reactor was about 64 sec. Products leaving the reactor were handled as in Example 1. Conversion was 60%. On distillation of the condensate, there were recovered 145.5 g. (0.774 mol) of $CF_3CF_2CF_3$ representing a 72% yield, and 66.0 g. (0.306 mol) of perfluorobutyryl fluoride, $CF_3CF_2CF_2COF$, representing a 28% yield, based on the perfluoroglutaryl difluoride reacted.

*Example 3.*—The pretreating and catalyst system and other apparatus was the same as that described under Example 2. During the run, the carbon pretreater was maintained at a temperature of about 320° C., and the aluminum fluoride reactor was maintained at a temperature of about 312° C. During a period of 2 hours and 40 minutes 238 g. (0.975 mol) of perfluoroglutaryl difluoride was passed into and thru the system. The contact time in the aluminum fluoride reactor was about 94 sec. Conversion was about 25%. Distillation of the cold trap condensate afforded recovery of 14.0 g. (0.075 mol) of perfluoropropane representing a 31% yield, and 35.5 g. (0.164 mol) of perfluorobutyryl fluoride representing a 68% yield, based on the starting material reacted.

*Example 4.*—The pretreater-reactor system was the same as in Example 2. During the run, the pretreater was maintained at a temperature of approximately 350° C. and the aluminum fluoride catalyst was maintained at a temperature of approximately 385° C. During about 1 hour and 55 minutes 21.5 g. (0.10 mol) of perfluorobutyryl fluoride, $CF_3CF_2CF_2COF$ B.P. 10° C. was passed through the system. Contact time in the aluminum fluoride reactor was about 300 sec. Products leaving the reactor were scrubbed with hot sodium hydroxide solution to remove unreacted perfluorobutyryl fluoride starting material from the exit gas. Vapors exiting from the caustic scrubber were passed through a drying tower and were condensed in a receiver cooled in a Dry Ice acetone mixture. Infrared absorption spectra of this scrubber exit gas showed it to be essentially perfluoropropane. The conversion of perfluorobutyryl fluoride to perfluoropropane was about 21%. Yield of $C_3F_8$, based on perfluorobutyryl fluoride reacted, was 100%.

*Example 5.*—The pretreater, reactor, and other apparatus were the same as in Example 2. During the run, the carbon pretreater was maintained at an internal temperature of about 350° C., and the aluminum fluoride catalyst reactor was maintained at an internal temperature of approximately 353° C. During an hour and 50 minutes, 242 g. (0.929 mol) of perfluoroglutaryl chlorofluoride, $COFCF_2CF_2CF_2COCl$ boiling point 70° C., was passed in vapor form through the pretreater and reactor. The contact time in the aluminum fluoride catalyst was about 60 seconds. Products leaving the reactor were condensed in a Dry Ice-acetone cooled trap as in Example 1 giving 152 g. of condensate. The condensate upon distillation gave 32.0 g. (0.156 mols) of 3-chloroheptafluoropropane B.P. minus 3° C. and 85 g. of a higher boiling residue. This higher boiling residue distilled between 36–90° C. Alkaline hydrolysis of the distillate indicated that it consisted of a mixture of acid halides. The conversion of perfluoroglutaryl chlorofluoride to 3-chloroheptafluoropropane was 21%.

We claim:

1. The process for decarbonylating a fluorinated organic starting material of the formula $CR(CF_2)_nCOX$ in which R is selected from the group consisting of OX and $XF_2$, $n$ is an integer from 2 to 3, and X is selected from the group consisting of chlorine and fluorine, which process comprises subjecting said starting material in gas phase to heating at temperature substantially in the range of 225–500° C. while in the presence of solid anhydrous aluminum fluoride catalyst for a time sufficient to decarbonylate a substantial amount of said starting material, said catalyst having crystallite size not substantially greater than 500 Angstrom units radius and having been derived by reaction of aluminum chloride and HF, and recovering reaction product containing less CO than said starting material and being of the formula $$CXF_2(CF_2)_pCR$$

in which $p$ is an integer from 1 to 2, and R and X are as above.

2. The process for decarbonylating a starting material comprising perfluoroglutaryl dihalide in which the halogens have an atomic number not higher than 17, which process comprises subjecting said starting material in gas phase to heating at temperature substantially in the range of 225–500° C. while in the presence of solid anhydrous aluminum fluoride catalyst for a time sufficient to decarbonylate a substantial amount of said starting material, said catalyst having crystallite size not substantially greater than 500 Angstrom units radius and having been derived by reaction of aluminum chloride and HF, and recovering decarbonylated reaction product of the formula $CXF_2(CF_2)_pCR$ in which R is selected from the group consisting of OX and $XF_2$, $p$ is an integer from 1 to 2, and X is selected from the group consisting of chlorine and fluorine.

3. The process of claim 2 in which temperature is substantially in the range of 275–425° C.

4. The process for decarbonylating perfluoroglutaryl difluoride starting material which process comprises subjecting in a reaction zone said starting material in gas phase to heating at temperature substantially in the range of 275–425° C. while in the presence of solid anhydrous aluminum fluoride catalyst for a time sufficient to decarbonylate a substantial amount of said starting material, said catalyst having crystallite size not substantially greater than 500 Angstrom units radius and having been derived by reaction of aluminum chloride and HF, discharging from said zone reaction product containing perfluorobutyryl fluoride and perfluoropropane, and separately recovering perfluorobutyryl fluoride and perfluoropropane.

5. The process of claim 4 in which the starting material is perfluorobutyryl fluoride, and product recovered is perfluoropropane.

6. The process for decarbonylating a starting material comprising perfluoroglutaryl dihalide in which the halogens have an atomic number not higher than 17, which process comprises subjecting in a reaction zone said starting material in gas phase to heating at temperature substantially in the range of 225–500° C. while in the presence of solid anhydrous aluminum fluoride catalyst for a time sufficient to decarbonylate a substantial amount of said starting material, said catalyst having crystallite radius and having been derived by reaction of aluminum chloride and HF, discharging from said zone decarbonylated reaction product comprising a mixture of compounds of the formula $CXF_2(CF_2)_pCR$ in which R is selected from the group consisting of OX and $XF_2$, $p$ is an integer from 1 to 2, and X is selected from the group consisting of chlorine and fluorine, and separately recovering $CXF(CF_2)CR$ and $CXF(CF_2)_2CR$.

References Cited in the file of this patent

UNITED STATES PATENTS 2,704,776   La Zert et al. _____ Mar. 22, 1955

OTHER REFERENCES

Rothstein et al.: J. Chem. Soc. (London), page 4559 (1956).